(12) United States Patent
Dimmer et al.

(10) Patent No.: US 9,470,706 B2
(45) Date of Patent: Oct. 18, 2016

(54) POWERLESS VEHICLE MOVEMENT DETECTOR

(71) Applicant: Thales Canada Inc, Toronto, Ontario (CA)

(72) Inventors: David Dimmer, Toronto (CA); Abe Kanner, Mississauga (CA)

(73) Assignee: Thales Canada Inc, Toronto, Ontario (CA)

( * ) Notice: Subject to any disclaimer, the term of this patent is extended or adjusted under 35 U.S.C. 154(b) by 414 days.

(21) Appl. No.: 14/085,736

(22) Filed: Nov. 20, 2013

(65) Prior Publication Data

US 2015/0137799 A1  May 21, 2015

(51) Int. Cl.
  *G01B 7/14* (2006.01)
  *G01P 13/04* (2006.01)
  *B60R 25/00* (2013.01)

(52) U.S. Cl.
  CPC ............ *G01P 13/04* (2013.01); *B60L 2200/40* (2013.01); *B60R 25/00* (2013.01)

(58) Field of Classification Search
  CPC ... B60L 2200/26; B60L 2200/40; G01P 3/42
  USPC .................................................. 324/207.11
  See application file for complete search history.

(56) References Cited

U.S. PATENT DOCUMENTS

| | | | |
|---|---|---|---|
| 1,870,347 A | 8/1932 | Roberts | |
| 4,945,347 A | 7/1990 | Perry | |
| 6,518,751 B1 | 2/2003 | Bujak | |
| 6,684,141 B2 | 1/2004 | Koors | |
| 6,853,301 B2 | 2/2005 | Devine | |
| 7,061,390 B2 | 6/2006 | Murata | |
| 7,649,350 B2 | 1/2010 | Heyden | |
| 8,453,976 B2 | 6/2013 | Lauterberg | |
| 2011/0035121 A1* | 2/2011 | Katrak | F16H 59/70 701/51 |

OTHER PUBLICATIONS

"Heads Up! Rail Car Motion Detector," Aug. 29, 2013, <http://www.westernsafety.com/aldon2010/aldon2010pg3.html>.
International Search Report for corresponding International Application No. PCT/IB2014/063443, dated Oct. 20, 2014.

* cited by examiner

*Primary Examiner* — Reena Aurora
(74) *Attorney, Agent, or Firm* — Hauptman Ham, LLP (57) ABSTRACT

An apparatus that determines that a vehicle has moved comprises a shaft member, a pin configured to attach the shaft member to a backing plate via an opening in the shaft member that enables the shaft member to move in a direction along the length of the shaft member, to rotate about the pin, and to contact a surface external to the vehicle when the shaft member is in a first position. The apparatus also comprises a first alignment magnet that attracts the shaft member to the surface external to the vehicle and a first sensor that determines that the shaft member is in the first position. The apparatus further comprises a first holding magnet, a second holding magnet, and at least one sensor that indicates that the shaft member is in contact with the first holding magnet or the second holding magnet, each indicating a direction of movement.

20 Claims, 5 Drawing Sheets

POWERLESS VEHICLE MOVEMENT DETECTOR

BACKGROUND

Vehicles such as cars, trains or railcars, for example, sometimes move or are moved when the vehicle is parked and the vehicle is powered off. Some approaches to determine whether a vehicle has moved in a powered off mode involve at least supplying some power to a controller to monitor movement or using a wayside controller.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion. One or more embodiments are depicted in the accompanying Figures, which are incorporated herein by reference, and in which.

DETAILED DESCRIPTION

The following disclosure provides many different embodiments, or examples, for implementing different features of the invention. Specific examples of components and arrangements are described below to simplify the present disclosure. These are examples and are not intended to be limiting.

Many vehicles have onboard controllers that monitor a vehicle position. Vehicles such as cars, trains or railcars are often driven or controlled to move from one position to another, parked, and turned off such that the vehicle is in a powered off mode. If present, the onboard controller is sometimes powered off as well. Some vehicle operators prefer to know a vehicle's current or last position upon powering on the vehicle, relying on the vehicle's position to enable full system/vehicle functionality. Some onboard controllers are therefore configured to save the vehicle's last known position upon shutdown to provide full functionality when the vehicle or controller is restarted.

An issue arises if the onboard controller is powered off and the vehicle moves from the last known position during the time that the onboard controller is powered off. If the vehicle did not move during the powered off mode, the stored last known position is valid and the onboard controller is able to provide full functionality after startup in reliance on the stored last known position. However, if the vehicle moved while the onboard controller was powered off, then a re-initialization of an onboard positioning system is required to be performed. Re-initialization of common onboard positioning systems sometimes requires the vehicle to be moved manually until a position of the vehicle is able to be verified such as, for example, by detecting two system transponders. Such re-initialization processes take time and affect system/vehicle operation.

Because operators cannot be certain that the vehicle did not move during the powered off mode, the position stored prior to shutdown cannot be safely verified. This requires the onboard controller to reset its position when powered on and thus requires operators to waste time performing the re-initialization process to ensure that the position of the vehicle is accurate. Some onboard controllers store their position automatically upon shutdown, but the last known position, of course, changes if the vehicle moved during the powered off mode.

Because it is difficult to determine whether a vehicle has moved while the vehicle was powered-down, onboard controllers are often left powered on while the remainder of the vehicle is powered off. Accordingly, power is provided to the onboard controller while all or most other subsystems of the vehicle are powered off. While keeping the onboard controller active enables monitoring of the position of the vehicle, such a process still consumes power and the vehicle is not completely powered off. This solution does not allow system traction power to be turned off, which is the norm when trains are in storage, since the onboard controller remains active—consuming power from a vehicle's onboard power supply or battery. The vehicle's onboard power supply, accordingly, continues to drain, and sometimes drains to the point that the power supply is incapable of powering the onboard controller for the necessary period of time.

Some vehicle monitoring systems are capable of determining whether a vehicle moved while the onboard controller was powered off to avoid excess power consumption. Vehicle movement monitoring systems that power off the onboard controller are often outfitted with one or more transponder interrogator antennas that are in communication with the onboard controller. The onboard controller stores a position upon shutdown and then confirms the stored position (i.e., the position saved when the onboard controller was powered-down) by wirelessly reading a transponder. This requires the vehicle to be parked within range of a transponder for easy position confirmation upon startup, which limits the locations where it can be applied.

An approach according to at least one embodiment, completely powers-down the vehicle, including the onboard controller, determines whether the vehicle moved while the onboard controller was powered off, and enables the onboard controller to indicate whether the re-initialization process that requires manual intervention needs to be performed, or is able to be otherwise skipped entirely. Skipping the re-initialization process would save time and make operation of the vehicle and any system associated with the vehicle more efficient.

Figure 1:
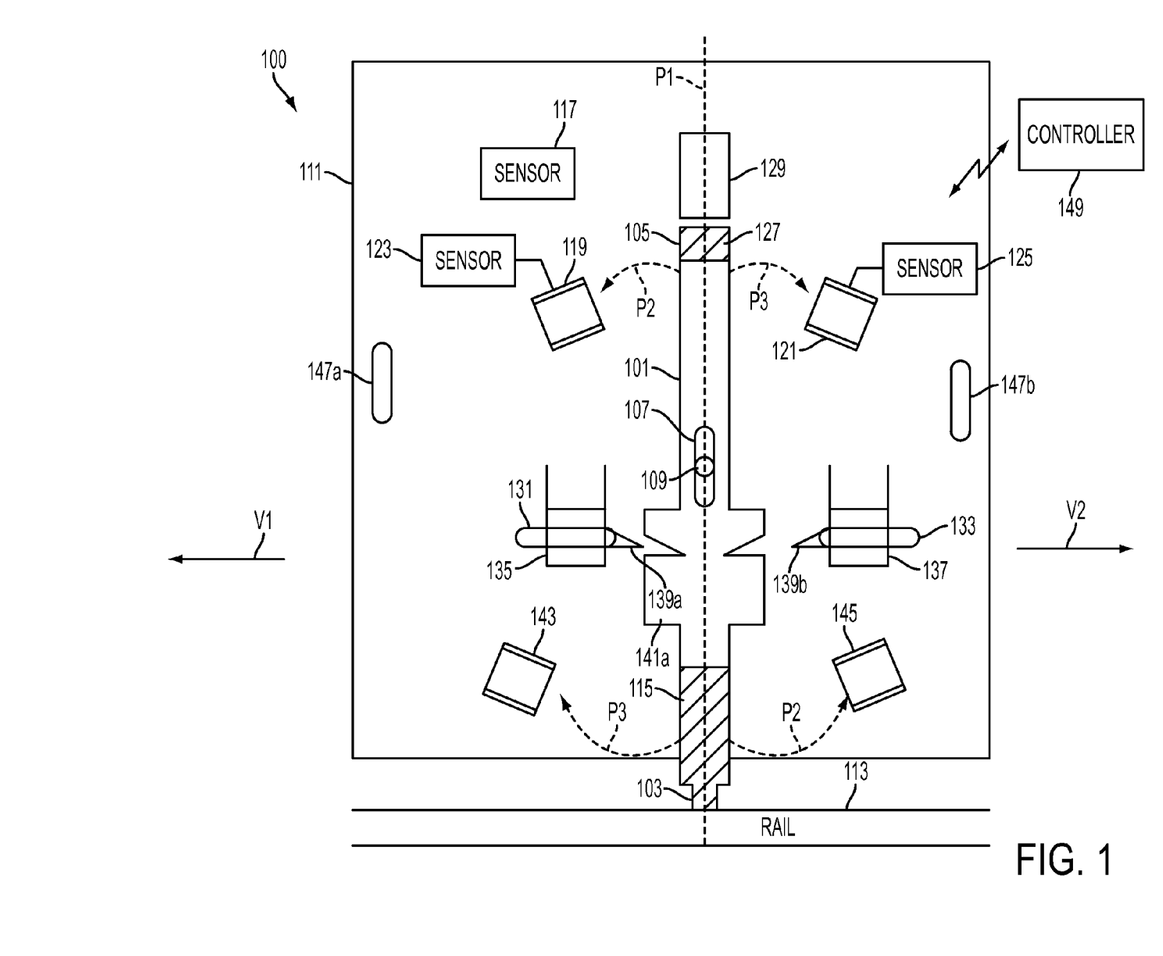
FIG. 1 is a schematic diagram of a movement detector system set in a position to detect vehicle movement, in accordance with one or more embodiments.

FIG. 1 illustrates a movement detector system 100 configured to indicate whether a vehicle has moved while the vehicle was powered off, in accordance with one or more embodiments.

The movement detector system 100 comprises a shaft member 101 having a length, a first end 103, a second end 105 distal the first end 103 in a direction along the length of the shaft member 101. The shaft member 101 has an elongated opening 107 extending longitudinally along the length of the shaft member 101.

The movement detector system 100 further comprises a pin 109 configured to attach the shaft member 101 to one or more of a vehicle (not shown) and a backing plate 111. The pin 109 is inserted into the elongated opening 107 and is configured to enable the shaft member 101 to move in a direction along the length of the shaft member 101, to rotate about the pin 109, and to contact a rail surface 113 external to the vehicle when the shaft member 101 is in a first position P1. In some embodiments, the first position P1 of the shaft member 100 corresponds to a vehicle position before movement such as, for example, a vehicle start position.

The movement detector system 100 also comprises a first alignment magnet 115 positioned at the first end 103 of the shaft member 101. The first alignment magnet 115 is configured, to be attracted to the rail surface 113 on which the vehicle is positioned. For example, if the vehicle is a train, the rail surface 113 is a metal rail.

The movement detector system 100 further comprises a first sensor 117 configured to determine the shaft member 101 is in the first position P1. In some embodiments, the first sensor 117 is a current detector configured to determine if the shaft member is in contact with the rail surface 113. For example, an electric current flows from the first sensor 117 to ground, i.e., the rail surface 113, and the first sensor 117 indicates the shaft member 101 is in the first position P1 against the rail surface 113. In some embodiments, the first sensor 117 is directly coupled to the shaft member 101. In other embodiments, the first sensor 117 is coupled to the shaft member 101 by way of pin 109.

The movement detector system 100 also comprises a first holding magnet 119 positioned on a left side of the shaft member 101, if the shaft member 101 is in the first position P1 and a second holding magnet 121 positioned on a right side of the shaft member 101, if the shaft member 101 is in the first position P1. In some embodiments, the first holding magnet 119 and the second holding magnet 121 are positioned toward an upper end of the shaft member 101, or toward the second end 105 of the shaft member 101. The first holding magnet 119 and the second holding magnet 121 are positioned within a sweep path of the second end 105 of the shaft member 101.

The movement detector system 100 additionally comprises at least one sensor configured to indicate the shaft member 101 is in one of a second position P2 in contact with the first holding magnet 119, or a third position P3 in contact with the second holding magnet 121. The second position P2 corresponds to a first vehicle movement direction V1 and the third position P3 corresponds to a second vehicle movement direction V2. For example, the at least one sensor includes one or more of a first direction position sensor 123 in communication with the first holding magnet 119 and a second direction position sensor 125 in communication with the second holding magnet 121. The first direction position sensor 123 is configured to indicate the shaft member 101 is in the second position P2, and the second direction position sensor 125 is configured to indicate the shaft member is in the third position P3.

The shaft member 101 is configured to remain in the second position P2 or the third position P3 after the vehicle moves in the first vehicle movement direction V1 or the second vehicle movement direction V2 until the shaft member 101 is caused to be re-oriented to the first position P1.

In some embodiments, the movement detector system 100 comprises a second alignment magnet 127 positioned at the second end 105 of the shaft member 101 and a third alignment magnet 129 positioned opposite an upper surface of the second alignment magnet 127 at the second end 105 of the shaft member 101 if the shaft member 101 is in the first position P1. The second alignment magnet 127 and the third alignment magnet 129 are configured to repel one another to cause the shaft member 101 to move in a direction away from the third alignment magnet 129 toward the rail surface 113.

In some embodiments, the first alignment magnet 115 is configured to be attracted to the rail surface 113, and the shaft member 101 is caused, at least in part, to be oriented in the first position P1 by the repulsive force between the second alignment magnet 127 and the third alignment magnet 129.

In some embodiments, the movement detector system 100 further comprises a first centering pin 131 positioned on the left side of the shaft member 101. The first centering pin 131 is configured to be selectively moved toward the shaft member 101 to engage the shaft member 101. The first centering pin 131, if engaged with the shaft member 101, causes the shaft member 101 to rotate in a counterclockwise direction. The first centering pin 131 is also configured to be selectively moved away from the shaft member 101 to disengage from the shaft member 101. The system movement detector system 100 additionally comprises a second centering pin 133 positioned on the right side of the shaft member 101. The second centering pin 133 is configured to be selectively moved toward the shaft member 101 to engage the shaft member 101. The second centering pin 133, if engaged with the shaft member 101, causes the shaft member 101 to rotate in a clockwise direction. The second centering pin 133 is also configured to selectively move away from the shaft member 101 to disengage from the shaft member 101.

The first centering pin 131 and the second centering pin 133 are configured to engage the shaft member 101 simultaneously to align the shaft member 101 in the first position P1. If the first centering pin 131 and the second centering pin 133 are disengaged from the shaft member 101, the shaft member 101 is allowed to move freely in the first vehicle movement direction V1 or the second vehicle movement direction V2.

In some embodiments, the first centering pin 131 is caused to be moved toward and away from the shaft member 101 by a first centering electromagnet 135. The second centering pin 133 is caused to be moved toward and away from the shaft member 101 by a second centering electromagnet 137. The first centering electromagnet 135 and the second centering electromagnet 137 are, therefore, configured to be selectively energized to, for example, align the shaft member in the first position P1, and de-energized to, for example, allow the shaft member to drop in order to make contact with the rail, and allow the shaft member 101 to move freely in the first vehicle movement direction V1 or the second vehicle movement direction V2.

In some embodiments, the first centering pin 131 and the second centering pin 133 comprise an end shape 139a, 139b configured to mate with corresponding receptors 141a, 141b in the shaft member 101, if the first centering pin 131 and the second centering pin 133 are engaged with the shaft member 101. In some embodiments, the end shapes 139a, 139b are conical. In some embodiments, the end shapes 139a, 139b are rounded. In one or more embodiments, the first centering pin 131 and the second centering pin 133 vertically align in respective engaged positions with the shaft member 101. In other embodiments, the first centering pin 131 and the second centering pin 133 engage the shaft member 101 to align the shaft member 101 in the first position P1, but the first centering pin 131 and the second centering pin 133 are vertically misaligned in the respective engaged positions.

In some embodiments, the movement detector system 100 further comprises a third holding magnet 143 positioned on the left side of the shaft member 101, and a fourth holding magnet 145 positioned on the right side of the shaft member 101. The third holding magnet 143 and the fourth holding magnet 145 are configured to hold the shaft member 101 in the third position P3 or the second position P2, respectively, until the shaft member 101 is caused to be re-oriented in the first position P1 by, for example, the first centering pin 131 and the second centering pin 133. In some embodiments, third holding magnet 143 and the fourth holding magnet 145 are positioned within a sweep path of the first end 103 of the shaft member 101.

In some embodiments, the movement detector system 100 includes the backing plate 111. Embodiments of the movement detector system 100 having the backing plate 111 optionally attach one or more other components of the movement detector system 100 to the backing plate 111. The backing plate 111 therefore enables the movement detector system 100 to be modularly attached to the vehicle. In some embodiments, the backing plate 111 comprises one or more adjustment devices 147a, 147b configured to adjust the height of one or more of the other components of the movement detector system 100 with respect to the vehicle, or any component thereof, such as one or more wheels. In some embodiments, the one or more adjustment devices 147a, 147b comprise elongated openings configured to enable height adjustment of the movement detector system 100 with respect to the vehicle to which the movement detector system 100 is attached. In other embodiments, the various other components of the movement detector system 100 are individually attached to the vehicle by connectors other than the backing plate 111.

Figure 5:
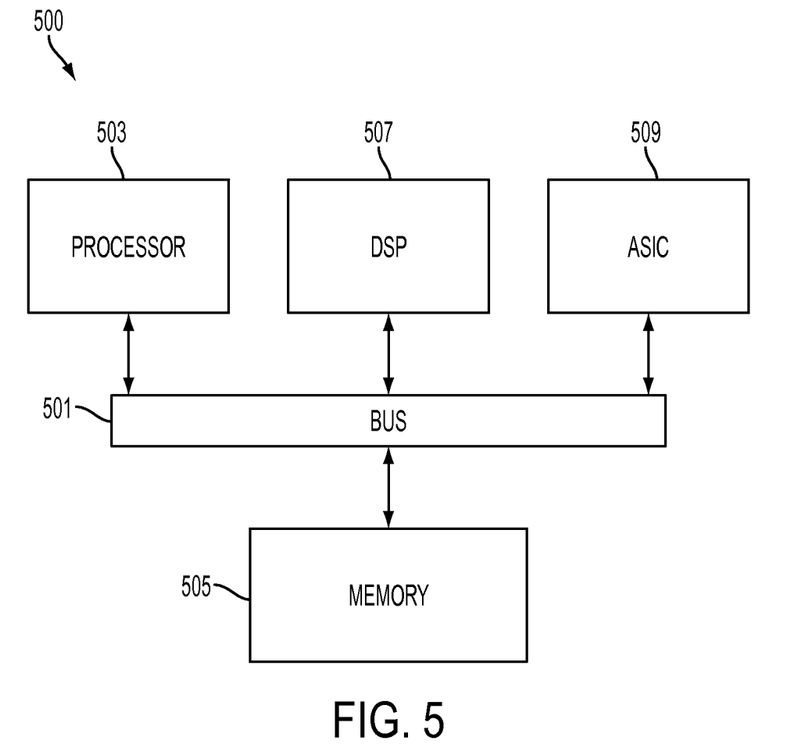
FIG. 5 is a high level block diagram of a chipset useable to implement one or more embodiments.

In some embodiments, the movement detector system 100 comprises a controller 149 that is one of onboard the movement detector system 100 and configured to communicate with an onboard controller of the vehicle to which the movement detector system 100 is attached, or is onboard the vehicle and configured to communicate either by wired or wireless communication with one of more of the various other components of the movement detector system 100. The controller 149 comprises a processor and a memory having computer readable instructions thereon, such as that described with respect to chip set 500, below.

The controller 149 is configured to determine the shaft member 101 is in one or more of the first position P1, the second position P2, and the third position P3 based, at least in part, on feedback from one or more of the first sensor 117, the first direction position sensor 123 or the second direction position sensor 125. The controller 149 is also configured to determine the vehicle has not moved based, at least in part, on a determination that the shaft member 101 is in the first position P1. The controller 149 is further configured to determine the vehicle has moved in one of the first vehicle movement direction V1 or the second vehicle movement direction V2 based on a determination that the shaft member 101 is in one of the second position P2 or the third position P3.

In response to a determination that the vehicle has moved, i.e., the shaft member 101 is determined to be in the second position P2, the third position P3, or a position other than the first position P1, the controller 149 initializes a process to determine the position of the vehicle based on the determination that the vehicle has moved in one of the first vehicle movement direction V1 or the second vehicle movement direction V2. In some embodiments, the controller 149 is configured to do a self-check that confirms the determined vehicle movement direction is accurate based, at least in part, on a comparison between a result of the process to determine the position of the vehicle and the determined vehicle movement direction using, for example, a last known position of the vehicle upon shutdown of the controller 149. The controller 149 is also, in some embodiments, configured to confirm, before being powered off, that if the shaft member 101 is oriented in the first position P1, the first centering pin 131 and the second centering pin 133 are disengaged from the shaft member 101.

In some embodiments, the movement detector system 100 is configured to indicate a vehicle to which the movement detector system 100 is attached has moved as follows:

The vehicle to which the movement detector system 100 is attached is driven to a particular position on the rail surface 113 and stopped. The shaft member 101 is caused to be oriented in the first position P1 by at least the first centering pin 131 and the second centering pin 133. The first centering pin 131 and the second centering pin 133 are caused to move toward the shaft member 101 and into the engaged position to orient the shaft member 101 by energizing the first centering electromagnet 135 and the second centering electromagnet 137, simultaneously. The controller 149 confirms the shaft member 101 is in the first position P1 based, at least in part, on feedback from the sensor 117 indicating that the shaft member 101 is in the first position P1.

The vehicle is powered off, power is removed from the first centering electromagnet 135 and the second centering electromagnet 137, causing the first centering pin 131 and the second centering pin 133 to move from the engaged position to the disengaged position. The combined repulsion between the third alignment magnet 129 and the second alignment magnet 127, attraction between the first alignment magnet 119 and the rail, and gravity, cause the shaft member 101 to be driven toward the rail surface 113, remaining in the first position P1 until the vehicle moves.

If the vehicle moves in the first vehicle movement direction V1, the shaft member 101, which was in contact with the rail surface 113 by magnetic attraction and gravity, is caused to move to the second position P2. Similarly, if the vehicle moves in the second vehicle movement direction V2, the shaft member 101, which was in contact with the rail surface 113 by magnetic attraction and gravity, is caused to move to the third position P3.

Upon moving, the shaft 101 will rotate and be held in position P2 by the combination of holding magnets 119 and 145 or be held in position P3 by the combination of holding magnets 121 and 143. The shaft member 101 will be held in the second position P2 or the third position P3, even if the vehicle moves back towards its original stopping position.

Upon returning the controller 149 from the powered off mode to the powered on mode, the controller 149 determines, based on feedback received from any of the first sensor 117, the first direction position sensor 123 or the second direction position sensor 125 whether the shaft member 101 has moved from the first position P1 to the second position P2, from the first position P1 to the third position P3 or remains in the first position P1. Alternatively, upon returning from the powered off mode, if the controller 149 is unable to detect a signal or receive feedback from any of the first sensor 117, the first direction position sensor 123 or the second direction position sensor 125, i.e. the shaft member 101 does not indicate either a movement or that the shaft member 101 is in the first position P1, or if the centering pins 131 and/or 132 are not in the engaged position, the controller 149 determines that the shaft member 101 has moved from the first position P1 in either the first vehicle movement direction V1 or the second vehicle movement direction V2.

If the controller 149 determines movement has occurred during the powered off mode, the controller 149 generates a signal or indication that an initialization process should be performed to determine the new position of the vehicle. If the controller 149 determines movement has not occurred, the controller 149 indicates that an initialization process need not be performed, thereby saving the vehicle operator time by not having to perform the position re-initialization process.

In some embodiments, when the controller 149 returns to the powered on mode, the first centering electromagnet 135, and the second centering electromagnet 137 are energized, which causes the centering pins 131 and 132 to lift the shaft member 101 away from the rail surface 113 to allow the vehicle to travel without the first end 103 contacting the rail surface 113. In other embodiments, the shaft member 101 is continually held in the second position P2 or the third position P3 up and away from the rail surface 113 to allow the vehicle to travel without the first end 103 of the shaft member 101 contacting the rail surface 113.

Figure 2:
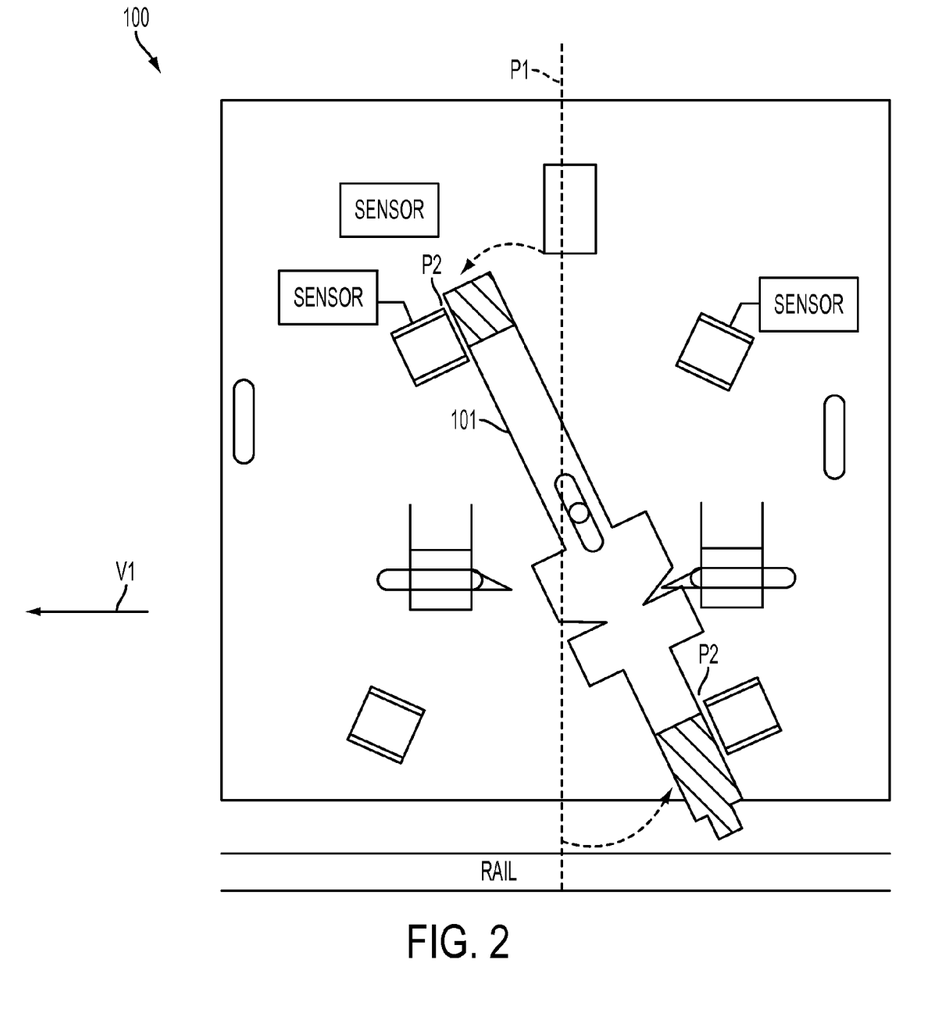
FIG. 2 is a schematic diagram of the FIG. 1 movement detector system after a vehicle to which the movement detector system is attached has moved, in accordance with one or more embodiments.

FIG. 2 is a diagram illustrating the movement detector system 100 after a vehicle to which the system is attached has moved, in accordance with one or more embodiments. In this example, the shaft member 101 is in the second position P2 indicating that the vehicle (and accordingly the movement detector system 100 and any components thereof) has moved in the first vehicle movement direction V1. The shaft member 101, accordingly moved from the first position P1 to the second position P2.

Figure 3:
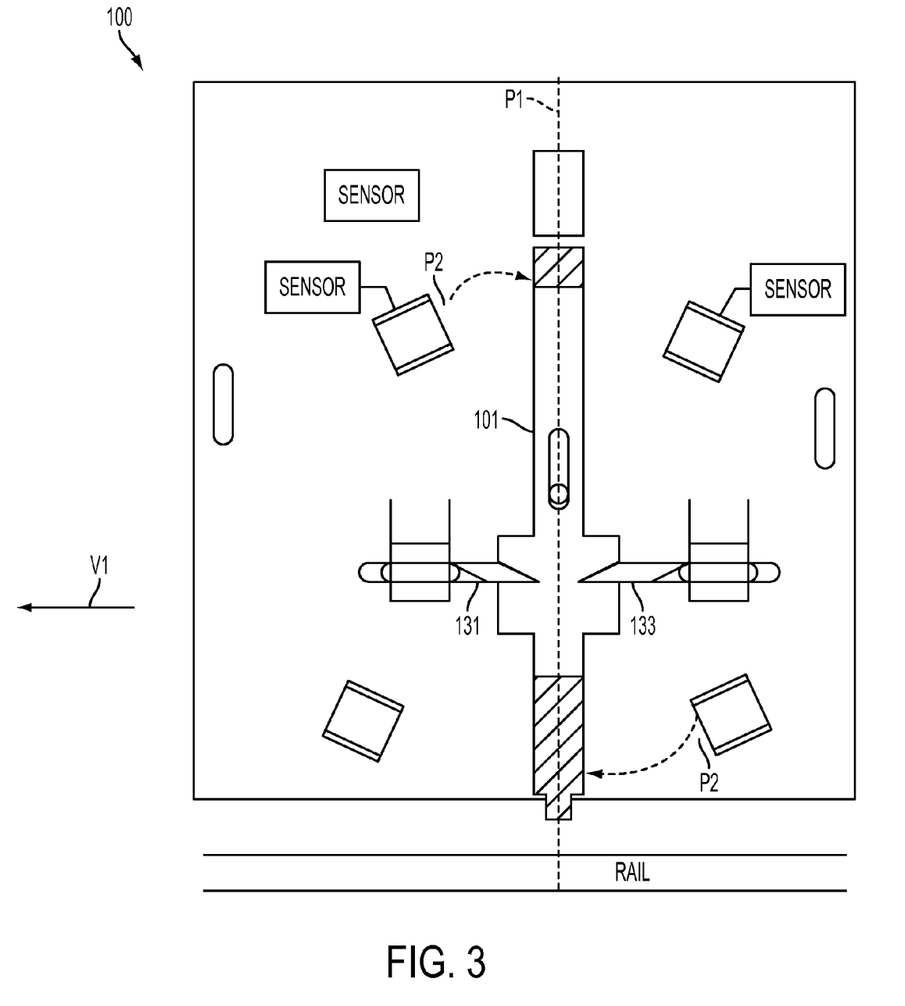
FIG. 3 is a schematic diagram of the FIG. 2 movement detector system being re-oriented after the vehicle to which the movement detector system is attached has moved, in accordance with one or more embodiments.

FIG. 3 is a schematic diagram of movement detector system 100 being re-oriented after a vehicle to which the movement detector system 100 is attached has moved, in accordance with one or more embodiments. In this example, the system movement detector 100 is reset and the shaft member 101 is moved from the second position P2 to the first position P1. The shaft member 101 is caused to re-orient to the first position P1, in this example, by the first centering pin 131 and the second centering pin 133 which are each demonstrated as being extended and in their respective engaged positions with the shaft member 101. From this position, the centering pins 131, 132 are retractable to the disengaged positions illustrated in FIG. 1.

Figure 4:
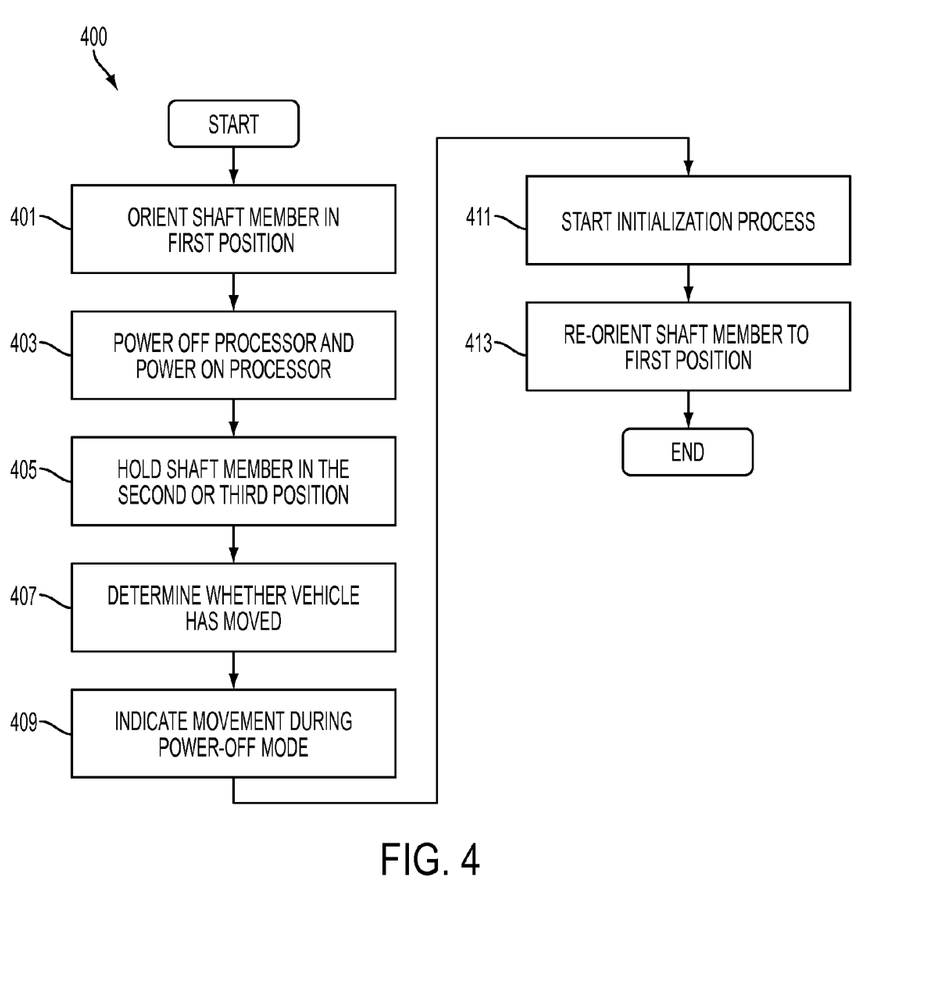
FIG. 4 is a flowchart of a process for determining whether vehicle movement has occurred, in accordance with one or more embodiments.

FIG. 4 is a flow chart of a method 400 of indicating a vehicle has moved during a powered off mode, in accordance with one or more embodiments. Method 400 begins with step 401 in which a processor such as processor 503 or a control module implemented in chip set 500 discussed in FIG. 5, causes a first centering pin and a second centering pin to orient a shaft member in a first position corresponding to a vehicle start position. The shaft member has a length, a first end, a second end distal the first end in a direction along the length of the shaft member, and an elongated opening extending longitudinally along the length of the shaft member. The shaft member is attached to one or more of a vehicle and a backing plate by a pin inserted into the elongated opening configured to enable the shaft member to move in a direction along the length of the shaft member, to rotate about the pin, and to contact a surface external to the vehicle when the shaft member is in the first position.

In step 403, the processor is powered off and later powered on. Powering off the processor causes the first centering pin and the second centering pin to disengage from the shaft member. When powered off, the shaft member is allowed to move freely in the first vehicle movement direction or the second vehicle movement direction.

In step 405, the shaft member is caused to remain in the second position or the third position after the vehicle moves in the first vehicle movement direction or the second vehicle movement direction until the shaft member is caused to be re-oriented to the first position. In some embodiments, any of a first holding magnet positioned on a left side of the shaft member in the first position, a second holding magnet positioned on the right side of the shaft member in the first position, a third holding magnet positioned on the left side of the shaft member and a fourth holding magnet positioned on the right side of the shaft member hold the shaft member in the second position or the third position until the shaft member is caused to be re-oriented in the first position.

In step 407, the processor determines whether the vehicle moved in one of a first vehicle movement direction or a second vehicle movement direction during a time period the processor was powered off, the first vehicle movement direction being based, at least in part, on the shaft member being in a second position in contact with a first holding magnet positioned on a left side of the shaft member with respect to the first position, and the second vehicle movement direction being based, at least in part, on the shaft member being in a third position in contact with a second holding magnet positioned on a right side of the shaft member, with respect to the first position. In some embodiments, the processor determines movement occurred during the powered off mode by determining the shaft member is not in the first position, the second position, or the third position. In some embodiments, the processor determines the shaft member is in one or more of the first position, the second position, or the third position based, at least in part, on feedback from one or more of the first sensor and the at least one sensor configured to indicate the shaft member is in one of the second position or the third position.

In step 409, the processor, accordingly, if the vehicle is determined to have moved, indicates via a message or an alarm, for example, that the vehicle has moved.

In step 411, the processor initializes a process to determine the position of the vehicle based on the determination that the vehicle has moved in one of the first vehicle movement direction or the second vehicle movement direction.

In step 413, the shaft member is selectively caused to be re-oriented into in the first position by the first centering pin by energizing a first centering electromagnet and the second centering pin by energizing a second centering electromagnet.

The processes described herein for indicating a vehicle has moved during a powered off mode may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 5 is a high level block diagram a chip set or chip 500 useable to implement one or more embodiments. Chip set 500 is programmed to indicate a vehicle has moved during a powered off mode, as described herein, and includes, for example, bus 501, processor 503, memory 505, DSP 507 and ASIC 509 components.

The processor 503 and memory 505 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 are implemented in a single chip. It is further contemplated that in certain embodiments the chip set or chip 500 is implemented as a single "system on a chip." It is further contemplated that in certain embodiments a separate ASIC would not be used, for example, and that all relevant functions as disclosed herein would be performed by a processor or processors, e.g., processor 503. Chip set or chip 500, or a portion thereof, constitutes a mechanism for performing one or more steps of indicating a vehicle has moved during a powered off mode.

In one or more embodiments, the chip set or chip 500 includes a communication mechanism such as bus 501 for passing information among the components of the chip set 500. Processor 503 has connectivity to the bus 501 to execute instructions and process information stored in, for example, the memory 505. In some embodiments, the processor 503 is also accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 503 performs a set of operations on information as specified by computer program code related to indicating a vehicle has moved during a powered off mode. The computer program code is a set of instructions or statements providing instructions for the operation of the processor and/or the computer system to perform specified functions.

The processor 503 and accompanying components have connectivity to the memory 505 via the bus 501. The memory 505 includes one or more of dynamic memory (e.g., RAM, magnetic disk, writable optical disk, etc.) and static memory (e.g., ROM, CD-ROM, etc.) for storing executable instructions that when executed perform the steps described herein to indicate a vehicle has moved during a powered off mode. The memory 505 also stores the data associated with or generated by the execution of the steps.

In one or more embodiments, the memory 505, such as a random access memory (RAM) or any other dynamic storage device, stores information including processor instructions for indicating a vehicle has moved during a powered off mode. Dynamic memory allows information stored therein to be changed by system 100. RAM allows a unit of information stored at a location called a memory address to be stored and retrieved independently of information at neighboring addresses. The memory 505 is also used by the processor 503 to store temporary values during execution of processor instructions. In various embodiments, the memory 505 is a read only memory (ROM) or any other static storage device coupled to the bus 501 for storing static information, including instructions, that is not changed by the movement detector system 100. Some memory is composed of volatile storage that loses the information stored thereon when power is lost. In some embodiments, the memory 505 is a non-volatile (persistent) storage device, such as a magnetic disk, optical disk or flash card, for storing information, including instructions, that persists even when the movement detector system 100 is turned off or otherwise loses power.

The term "computer-readable medium" as used herein refers to any medium that participates in providing information to processor 503, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

One aspect of this description relates to an apparatus comprising a shaft member having a length, a first end, a second end distal the first end in a direction along the length of the shaft member, and an elongated opening extending longitudinally along the length of the shaft member. The apparatus also comprises a pin configured to attach the shaft member to one or more of a vehicle or a backing plate, the pin being inserted into the elongated opening configured to enable the shaft member to move in a direction along the length of the shaft member, to rotate about the pin, and to contact a surface external to the vehicle if the shaft member is in a first position corresponding to a vehicle start position. The apparatus further comprises a first alignment magnet positioned at the first end of the shaft member, the first alignment magnet being configured to attract the shaft member to the surface external to the vehicle.

The apparatus additionally comprises a first sensor configured to determine the shaft member is in the first position. The apparatus also comprises a first holding magnet positioned on a left side of the shaft member if the shaft member is in the first position. The apparatus further comprises a second holding magnet positioned on a right side of the shaft member, if the shaft member is in the first position. The apparatus additionally comprises at least one sensor configured to indicate the shaft member is in one of a second position in contact with the first holding magnet, or a third position in contact with the second holding magnet, the second position corresponding to a first vehicle movement direction and the third position corresponding to a second vehicle movement direction.

Another aspect of this description relates to a method comprising causing a shaft member to be oriented in a first position corresponding to a vehicle start position, the shaft member having a length, a first end, a second end distal the first end in a direction along the length of the shaft member, and an elongated opening extending longitudinally along the length of the shaft member, the shaft member being attached to one or more of a vehicle or a backing plate by a pin inserted into the elongated opening configured to enable the shaft member to move in a direction along the length of the shaft member, to rotate about the pin, and to contact a surface external to the vehicle if the shaft member is in the first position.

The method also comprises determining the vehicle moved in one of a first vehicle movement direction or a second vehicle movement direction, the first vehicle movement direction being based, at least in part, on the shaft member being in a second position in contact with a first holding magnet positioned on a left side of the shaft member with respect to the first position, and the second vehicle movement direction being based, at least in part, on the shaft member being in a third position in contact with a second holding magnet positioned on a right side of the shaft member, with respect to the first position.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Although features of various embodiments are expressed in certain combinations among the claims, it is contemplated that these features can be arranged in any combination and order. It is therefore intended that the protection granted hereon be limited only by the definition contained in the appended claims and equivalents thereof.

What is claimed is:

1. An apparatus comprising:
   a shaft member having a length, a first end, a second end distal the first end in a direction along the length of the shaft member, and an elongated opening extending longitudinally along the length of the shaft member;
   a pin configured to attach the shaft member to one or more of a vehicle or a backing plate, the pin being inserted into the elongated opening configured to enable the shaft member to move in a direction along the length of the shaft member, to rotate about the pin, and to contact a surface external to the vehicle if the shaft member is in a first position corresponding to a vehicle start position;
   a first alignment magnet positioned at the first end of the shaft member, the first alignment magnet being configured to attract the shaft member to the surface external to the vehicle;
   a first sensor configured to determine the shaft member is in the first position;
   a first holding magnet positioned on a left side of the shaft member, if the shaft member is in the first position;
   a second holding magnet positioned on a right side of the shaft member, if the shaft member is in the first position; and
   at least one sensor configured to indicate the shaft member is in one of a second position in contact with the first holding magnet, or a third position in contact with the second holding magnet, the second position corresponding to a first vehicle movement direction and the third position corresponding to a second vehicle movement direction.

2. The apparatus of claim 1, further comprising:
   a first centering pin positioned on the left side of the shaft member, the first centering pin being configured to move toward the shaft member to engage the shaft member and away from the shaft member to disengage the shaft member;
   a second centering pin positioned on the right side of the shaft member, the second centering pin being configured to move toward the shaft member to engage the shaft member and away from the shaft member to disengage the shaft member,
   wherein the first centering pin and the second centering pin (1) orient the shaft member in the first position if the first centering pin and the second centering pin are engaged with the shaft member, and (2) allow the shaft member to move freely in the first vehicle movement direction or the second vehicle movement direction if the first centering pin and the second centering pin are disengaged from the shaft member.

3. The apparatus of claim 2, wherein the first centering pin and the second centering pin engage the shaft member simultaneously to orient the shaft member in the first position.

4. The apparatus of claim 2, further comprising:
   a first centering pin electromagnet configured to cause the first centering pin to engage the shaft member; and
   a second centering pin electromagnet configured to cause the first centering pin to engage the shaft member.

5. The apparatus of claim 2, wherein the first centering pin and the second centering pin comprise an end shape configured to mate with corresponding receptors in the shaft member if the first centering pin and the second centering pin are engaged with the shaft member.

6. The apparatus of claim 1, further comprising:
   a second alignment magnet positioned at the second end of the shaft member; and
   a third alignment magnet positioned opposite an upper surface of the second alignment magnet,
   wherein the second alignment magnet and the third alignment magnet are configured to repel one another.

7. The apparatus of claim 1, wherein the at least one sensor configured to indicate the shaft member is in one of the second position or the third position comprises a first direction position sensor in communication with the first holding magnet and a second direction position sensor in communication with the second holding magnet, the first direction position sensor being configured to indicate the shaft member is in the second position and the second direction position sensor being configured to indicate the shaft member is in the third position.

8. The apparatus of claim 7, further comprising:
   a third holding magnet positioned on the left side of the shaft member; and
   a fourth holding magnet positioned on the right side of the shaft member,
   wherein the third holding magnet and the fourth holding magnet are configured to hold the shaft member in the second position or the third position until the shaft member is caused to be oriented to the first position.

9. The apparatus of claim 1, further comprising:
   a controller comprising a processor and a memory having computer readable instructions thereon, the controller being configured to:
   determine the shaft member is in one or more of the first position, the second position, and the third position based, at least in part, on feedback from one or more of the first sensor and the at least one sensor configured to indicate the shaft member is in one of the second position or the third position;

selectively cause the shaft member to be oriented to the first position;

determine the vehicle has moved in one of the first vehicle movement direction or the second vehicle movement direction based on a determination that the shaft member is in one of the second position or the third position; and initialize a process to determine the position of the vehicle based on the determination that the vehicle has moved in one of the first vehicle movement direction or the second vehicle movement direction.

10. The apparatus of claim 9, wherein the controller is further configured to:

confirm the determined vehicle movement direction is accurate based, at least in part, on a comparison between a result of the process to determine the position of the vehicle and the determined vehicle movement direction; and confirm, before powering off the controller, that if the shaft member is oriented in the first position, the first centering pin and the second centering pin are disengaged from the shaft member.

11. The apparatus of claim 1, further comprising:
the backing plate; and
an adjustment device configured to adjust the height of one or more of the shaft member, the first alignment magnet, the first sensor, the first holding magnet, the second holding magnet, or the at least one sensor configured to indicate the shaft member is in one of the second position or the third position, the height being adjusted with respect to the vehicle.

12. A method comprising:

causing a shaft member to be oriented in a first position corresponding to a vehicle start position, the shaft member having a length, a first end, a second end distal the first end in a direction along the length of the shaft member, and an elongated opening extending longitudinally along the length of the shaft member, the shaft member being attached to one or more of a vehicle or a backing plate by a pin inserted into the elongated opening configured to enable the shaft member to move in a direction along the length of the shaft member, to rotate about the pin, and to contact a surface external to the vehicle if the shaft member is in the first position;

determining the vehicle moved in one of a first vehicle movement direction or a second vehicle movement direction, the first vehicle movement direction being based, at least in part, on the shaft member being in a second position in contact with a first holding magnet positioned on a left side of the shaft member with respect to the first position, and the second vehicle movement direction being based, at least in part, on the shaft member being in a third position in contact with a second holding magnet positioned on a right side of the shaft member with respect to the first position.

13. The method of claim 12, further comprising:

causing a first centering pin positioned on the left side of the shaft member to move toward the shaft member to engage the shaft member or away from the shaft member to disengage the shaft member;

causing a second centering pin positioned on the right side of the shaft member to selectively move toward the shaft member to engage the shaft member or away from the shaft member to disengage the shaft member;

causing the shaft member to be oriented in the first position by engaging the first centering pin and the second centering pin with the shaft member; and allowing the shaft member to move freely in the first vehicle movement direction or the second vehicle movement direction by disengaging the first centering pin and the second centering pin from the shaft member.

14. The method of claim 13, wherein the first centering pin and the second centering pin are caused to engage the shaft member simultaneously to orient the shaft member in the first position.

15. The method of claim 13, wherein engaging the first centering pin and the second centering pin with the shaft member comprises:

energizing a first centering pin electromagnet configured to cause the first centering pin to engage the shaft member; and energizing a second centering pin electromagnet configured to cause the first centering pin to engage the shaft member.

16. The method of claim 12, wherein the at least one sensor configured to indicate the shaft member is in one of the second position or the third position comprises a first direction position sensor in communication with the first holding magnet and a second direction position sensor in communication with the second holding magnet, the first direction position sensor being configured to indicate the shaft member is in the second position and the second direction position sensor being configured to indicate the shaft member is in the third position.

17. The method of claim 12, wherein the shaft member is at least partially caused to be oriented in the first position by a repelling force between a second alignment magnet and a third alignment magnet.

18. The method of claim 12, further comprising:

determining the shaft member is in one or more of the first position, the second position, or the third position based, at least in part, on feedback from one or more of the first sensor and the at least one sensor configured to indicate the shaft member is in one of the second position or the third position;

determining the vehicle moved in one of the first vehicle movement direction or the second vehicle movement direction based on a determination that the shaft member is in one of the second position or the third position; and initializing a process to determine the position of the vehicle based on the determination that the vehicle has moved in one of the first vehicle movement direction or the second vehicle movement direction.

19. The method of claim 18, further comprising:

powering off a controller configured to determine the shaft member is in one or more of the first position, the second position, or the third position;

powering on the controller;

determining the vehicle moved in the first vehicle movement direction or the second vehicle movement direction during a time period the controller was powered off.

20. The method of claim 19, further comprising:

confirming the determined vehicle movement direction is accurate based, at least in part, on a comparison between a result of the process to determine the position of the vehicle and the determined vehicle movement direction; and confirming, before powering off the controller, that the shaft member is oriented in the first position the first centering pin and the second centering pin are disengaged from the shaft member.

\* \* \* \* \*